Sept. 12, 1944.  A. C. KOETT  2,358,077

AUGER BIT

Filed April 9, 1943

INVENTOR.
Albert C. Koett
BY Wood, Arey, Herron & Evans
Attorneys.

Patented Sept. 12, 1944

2,358,077

UNITED STATES PATENT OFFICE 2,358,077

AUGER BIT

Albert C. Koett, Cincinnati, Ohio, assignor to The Kett Tool Company, Cincinnati, Ohio, a corporation of Ohio Application April 9, 1943, Serial No. 482,404

3 Claims. (Cl. 145—116)

This invention relates to auger bits designed especially for boring holes of relatively large diameter in wood and similar fibrous materials. The bits are of the general type used in the jack and consist essentially of cutting edges having spiral flutes leading from them, a threaded tapered spur or nose for advancing the cutting edge into the wood, and a shank at the opposite end through which the bit is driven. While bits of the conventional type are suitable for boring holes of relatively small diameter, up to about an inch, a great deal of power and effort is required to rotate bits of larger sizes and the principal object of the present invention has been to provide an auger bit which may be operated in an easy and convenient manner for drilling large-sized holes.

The bits of the present invention have the same component parts as those used in the past, but the parts themselves are of a different structure through which the ease of operation is obtained. Briefly, the present bits consist essentially of an elongated nose or lead which throughout a portion of its length is tapered and throughout the remainder, up to the juncture of the nose and cutting edges, it is of a substantially uniform diameter. Both the tapering and non-tapering portions are threaded with a fine pitch screw thread, a thread, for purposes of illustration, of the order of thirty-two pitch or thereabouts which is appreciably finer than the threads used in the past. In the preferred form the nose itself contains a spiral flute or several of them and the outside diameter of the fluted body of the bit which continues rearwardly from the cutting edges is tapered for clearance purposes. A spur, extending forwardly beyond the cutting lip to sever fibers at the circumference, is provided in the usual manner at the periphery of one or more of the cutting edges to delineate the circle being cut.

By virtue of this construction and particularly by virtue of the configuration of the nose through which the bit is drawn and advanced into the work, the amount of power or effort required to operate the bit is but a fraction of the power required to drive a conventional bit of comparable size. Heretofore it has been thought necessary to employ a lead screw of substantial pitch at the bit nose in order that the threads could obtain the necessary purchase in the wood; such an arrangement is satisfactory for small size holes but as the bit diameter increases the lead screw, however heavy it may be, tears the wood and thereby strips the threads formed in it, thereafter acting as nothing more than a pilot whereby still heavier axial pressures are required at the lips to obtain a cutting action.

Paradoxically, I have determined that if the lead screw threads be of small pitch the relatively weak purchase obtained by each thread is offset by the greater number of them. In biting into the wood the fibers are not pushed out sidewisely by the threads to such a degree that they break; they therefore do not tear and a smooth advancing action is obtained. Moreover, the spreading apart of the fibers as the nose advances through them is a gradual spreading. For drilling softer woods like pine, cypress and fir the nose need have no flute but if holes are to be drilled in harder woods in which the fibers are more difficult to separate, I have determined that a flute at the nose provides clearance and a cutting action which assists in imparting to the wood a thread complementary to that on the nose.

While a pitch of thirty-two threads per inch is preferred in the bits of this invention, the exact thread spacing is not critical and it is of course intended that the present invention comprehend variations such as twenty-eight, thirty and thirty-six pitch and the like in the advancing nose.

A typical bit constructed in accordance with the present invention is shown in the drawing in which.

Figure 1:
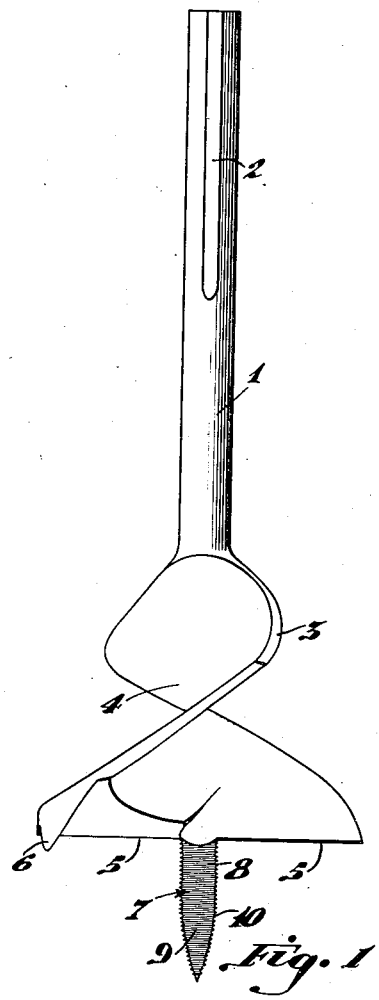
Figure 1 is a side elevation.

In the drawing, 1 designates the bit shank which is adapted to be held in the chuck of a brace or other suitable driving apparatus. The shank may be provided with a flat 2 for better purchase of the chuck. In fact, the bits of the present invention are especially suited to be power driven at high speed through portable drill heads driven electrically or pneumatically; in this respect the nose provides a smooth gradual infeed and the cutting lips exert a shaving rather than a biting action on the wood.

The body of the bit is designated 3 and it is fluted in the usual manner as at 4. The body may be of any suitable length depending upon the purpose for which the tool is used. The tools shown in the drawing are especially designed for boring in restricted spaces and, in fact, where the limitations on space are still more restricted the shank may be shortened and provided with a hub tapped out to screw directly on a chuck spindle.

It is usually preferable that the outside diameter of the body portion of the bit be tapered toward the shank for clearance so that the back part of the body does not bind against the wall of a hole in case the tool is tilted during drilling.

The forward portion of the body terminates in cutting edges 5, while the body may have one, or as shown, two flutes and therefore two cutting edges to provide a balanced cutting action. At the circumferential extremities at both or one of the cutting edges a circle spur 6 may be provided which extends beyond the cutting edge.

The nose is indicated at 7 and consists of a substantially non-tapered portion 8 and a tapered portion 9 which is in advance of the non-tapered portion. Throughout substantially the entire length of the nose 7 it is provided with fine pitch threads 10 for the purpose previously described. The nose, at the non-tapered portion, should preferably be of substantial diameter, at least one-quarter inch or more on bits in the neighborhood of three inch over-all diameter and suitably proportioned in bits of other size to provide strength against bending the necessary purchase area at the threads thereof.

Figure 2:
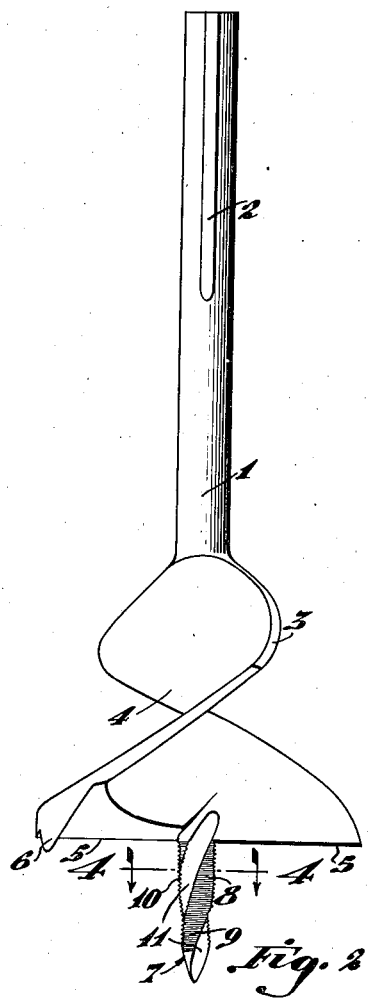
Figure 2 is a view similar to Figure 1 showing a modified form of bit having a fluted nose.
Figure 3:
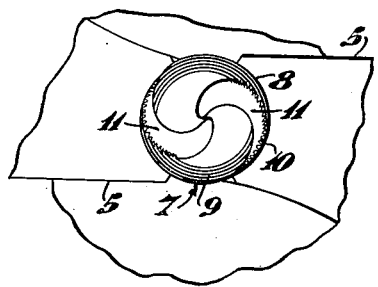
Figure 3 is an enlarged end view of the bit of Figure 2.
Figure 4:
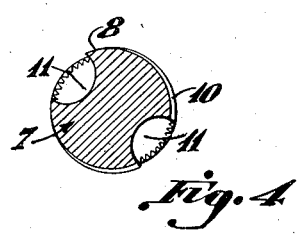
Figure 4 is a sectional view taken through the nose on the line 4—4, of Figure 2.

In the modification shown in Figure 2, flutes 11 are cut in spiral direction longitudinally of the nose to exert a slight cutting action in the hard woods. In this embodiment the flutes taper with the nose so that the end of it is of point-like configuration to enable it to enter the work. As infeed progresses, some of the material is spread apart by the nose and some material is cut away by the cutting action of the flute edges. However, the material not removed is pressed to take the thread configuration to maintain the infeed action during drill rotation.

Having described my invention, I claim:

1. An auger bit comprising a drive shank, a fluted body extending from the shank and terminating in a lateral cutting edge and a nose axially aligned with the shank and extending from the cutting edge, said nose comprising a slender member having a substantially non-tapering portion adjacent the cutting edge and having a tapering portion therebeyond terminating in substantially a point, said nose having a cutting edge spiral flute cut in it longitudinally and threaded with a fine pitch screw thread throughout substantially its length.

2. An auger bit comprising a drive shank, a fluted body extending from the shank and terminating in a lateral cutting edge and a nose axially aligned with the shank and body and extending beyond said cutting edge, said nose being a slender member having a substantially non-tapering portion adjacent the cutting edge, a tapering portion extending therebeyond and having a spiral flute cut in it longitudinally, said flute presenting a cutting edge and communicating with a flute of said body, the said nose being threaded with a fine pitch screw thread throughout substantially its length and having cutting lips at its extremity whereby the nose constitutes a drill having a threaded periphery.

3. An auger bit comprising a drive shank, a spirally fluted body extending beyond the drive shank, said body terminating in laterally extending cutting edges and a nose which is axially aligned with said body and said shank and extending beyond said cutting edges, said nose comprising a member having a substantially non-tapering portion and a tapering portion therebeyond which terminates in substantially a point, said nose having a cutting edge spiral flute extending longitudinally of it and being threaded throughout substantially its length with a screw thread of substantially thirty-two pitch.

ALBERT C. KOETT.